US010440498B1

(12) United States Patent
Amengual Garí et al.

(10) Patent No.: US 10,440,498 B1
(45) Date of Patent: Oct. 8, 2019

(54) ESTIMATING ROOM ACOUSTIC PROPERTIES USING MICROPHONE ARRAYS

(71) Applicant: Facebook Technologies, LLC, Menlo Park, CA (US)

(72) Inventors: Sebastià Vicenç Amengual Garí, Seattle, WA (US); William Owen Brimijoin, II, Kirkland, WA (US); Philip Robinson, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/180,165

(22) Filed: Nov. 5, 2018

(51) Int. Cl.
  *H04S 7/00* (2006.01)
  *G01H 7/00* (2006.01)
(52) U.S. Cl.
  CPC .............. *H04S 7/305* (2013.01); *G01H 7/00* (2013.01); *H04S 7/301* (2013.01)
(58) Field of Classification Search
  CPC ............ H04S 7/301; H04S 7/305; G01H 7/00

USPC ........................................................ 381/303
See application file for complete search history.

(56) References Cited

U.S. PATENT DOCUMENTS

2019/0103849 A1\* 4/2019 Shaya .................. H04R 29/001

\* cited by examiner

*Primary Examiner* — Paul Kim
(74) *Attorney, Agent, or Firm* — Fenwick & West LLP

(57) ABSTRACT

An audio analysis system receives a first recording of a speech signal from an origin audio assembly and a second recording of at least a portion of the speech signal from a receiving audio assembly. The speech signal originates from a speaking user of the origin audio assembly and the second recording is recorded by a receiving audio assembly operated by a different user. Both the origin audio assembly and the receiving audio assembly are located within a room. The audio analysis system selects one or more audio frames in the first recording and one or more audio frames in the second recording that both occur over the same time period. The audio analysis system determines a transfer function for the room based in part on the selected one or more audio frames in the first recording and the selected one or more audio frames in the second recording.

20 Claims, 5 Drawing Sheets

US 10,440,498 B1

ESTIMATING ROOM ACOUSTIC PROPERTIES USING MICROPHONE ARRAYS

BACKGROUND

This disclosure relates generally to stereophony and specifically to estimating room acoustic properties (e.g., an impulse response) using a microphone array.

A sound perceived at the ears of two users can be different, depending on a direction and a location of a sound source with respect to each user as well as on the surroundings of a room in which the sound is perceived. Humans can determine a location of the sound source by comparing the sound perceived at each set of ears. In an artificial reality environment, simulating sound propagation between the users may use knowledge about the acoustic properties of the room, for example a reverberation time or the direction of incidence of the strongest early reflections. And conventional methods for simulating sound propagation effects and acoustic properties within a room, for example using computer vision techniques to generate a room geometry, have a high computational cost.

SUMMARY

An audio analysis system implements multiple audio assemblies and a controller to measure the acoustic properties, for example a room impulse response, of a room in which the audio assemblies are positioned. Of the multiple audio assemblies, a first audio assembly records a first recording of a speech signal. The first audio assembly, often referred to as an "origin audio assembly" is operated by a user from which the speech signal originates. The first recording of the speech signal describes the speech signal initially emitted by the speaking user. A second audio assembly records a second recording that includes at least a portion of the speech signal. The second audio assembly (which is separate from the first audio assembly), often referred to as a "receiving audio assembly" is operated by a different user hearing the speech signal. The second recording recorded by the receiving audio assembly represents the speech signal as heard by the receiving user. The designation of "origin audio assembly" or "receiving audio assembly" may be reassigned to different audio assemblies depending on which audio assembly records the first recording or the second recording. In some embodiments, an audio assembly may concurrently be both an origin audio assembly and a receiving audio assembly.

In some embodiments a method is described. The method comprises receiving both the first recording and the second recording from the origin audio assembly and the receiving audio assembly, respectively. One or more audio frames in the first recording and one or more audio frames in the second recording are selected that both occur over a same time period. Based in part on the selected audio frames from both of the first and second recordings, a transfer function for the room is determined. The transfer function of the room may be analyzed to determine a room impulse response describing the acoustic effects of the room on sound propagation. Based on the room impulse response, a controller is able to extrapolate acoustic properties of the room or features and objects within a room. Using the extrapolated acoustic properties and the room impulse responses, a system may simulate perceptually convincing sound propagation effects in an artificial reality environment. In some embodiments, steps of the method may be stored on a computer readable medium.

In some embodiments, some or all of the audio system is part of a device. For example, a device including a microphone array and a controller. The microphone array includes a plurality of acoustic sensors, and records a first recording of a speech signal originating from a speaking user. The controller receives a second recording of the speech signal recorded at a receiving audio assembly that is remote from the device, and the device and the receiving audio assembly are located within a room. The controller selects one or more audio frames in the first recording and one or more audio frames in the second recording that both occur over a same time period. The controller determines a transfer function for the room based in part on the selected one or more audio frames in the first recording and the selected one or more audio frames in the second recording.

Figure 1:
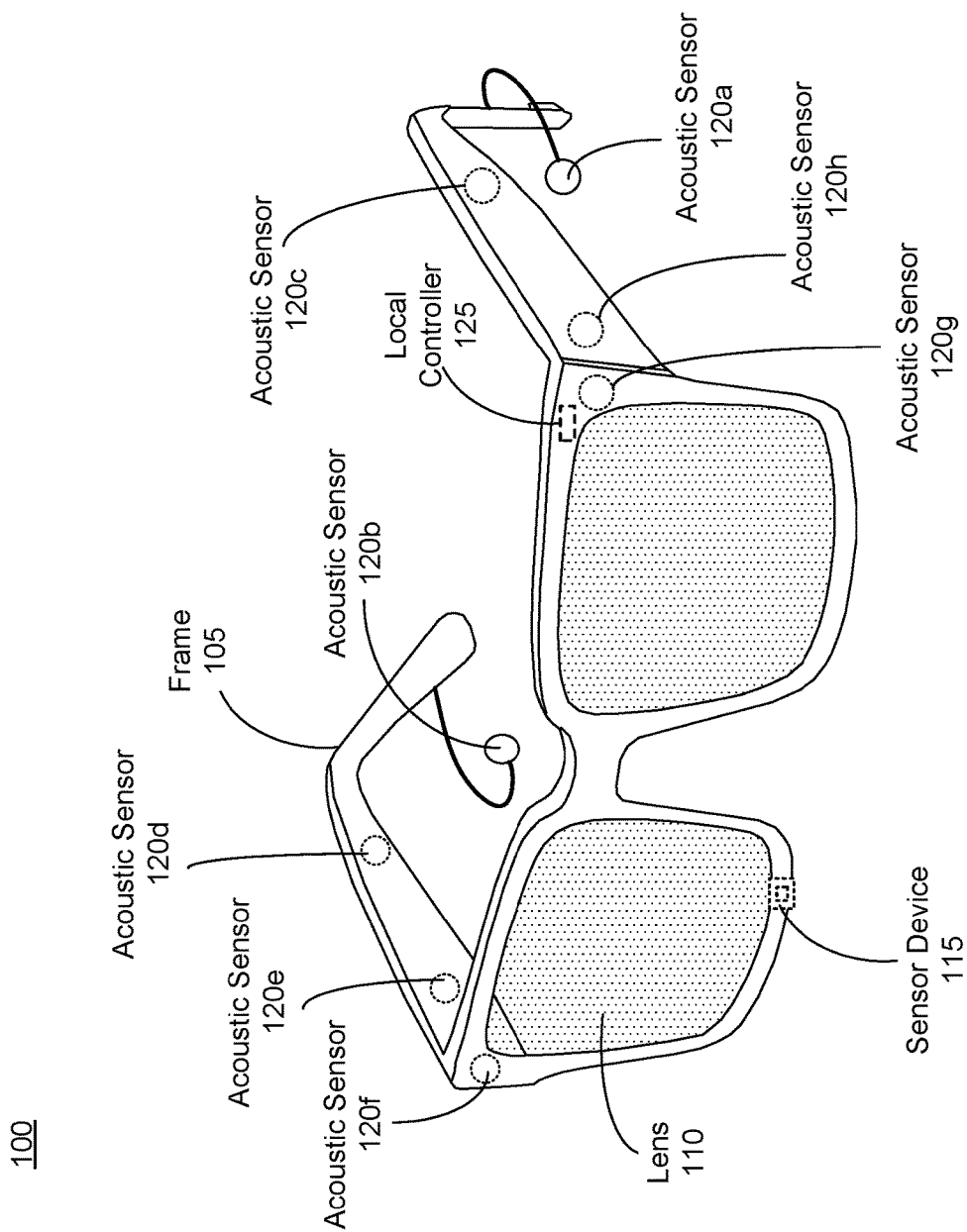
FIG. 1 is an example diagram of a headset including a microphone array, according to one or more embodiments.

The figures depict various embodiments of the present disclosure for purposes of illustration only. One skilled in the art will readily recognize from the following discussion that alternative embodiments of the structures and methods illustrated herein may be employed without departing from the principles, or benefits touted, of the disclosure described herein.

DETAILED DESCRIPTION

Configuration Overview

An audio analysis system measures the acoustic properties of a room using a set of microphone arrays. The audio analysis system is configured to include multiple audio assemblies positioned some distance away from each other within a room. The audio assemblies may be components of headsets (e.g., near-eye displays, head-mounted displays) worn by the users. Each audio assembly records a speech signal using one or more microphone arrays. One of the users, referred to as a "speaking user," speaks or emits a sound and their audio assembly records a recording of the speech signal. The audio assembly used by the speaking user is referred to as the "origin audio assembly." A microphone array embedded within the origin audio assembly records a recording of the sound emitted by the speaking user. Microphone arrays embedded within the remaining audio assemblies of the audio system record a second recording of the speech signal. The audio assemblies which record the second recordings are referred to as "receiving audio assemblies" and users using each receiving audio assembly are referred to as "receiving users."

Depending on their position, the receiving audio assembly may receive speech signals from various directions of arrival at various levels of strength, for example speech signals traveling directly from the origin audio assembly to the receiving audio assembly or speech signals reflecting off of surfaces in the room. Speech signals traveling through a room to a receiving audio assembly may reflect off of surfaces within the room, resulting in a decrease in the strength of the speech signal. Accordingly, the receiving audio assembly's recording may include timing, frequency dependent amplitude, directional information from the room reflections, or a combination thereof.

A controller selects a set of audio frames shared by both the recordings and determines a transfer function for the room based in part on the frames. The transfer function describes the difference in signals recorded by the origin audio assembly and the receiving audio assembly caused by the acoustic properties of the room, for example reflections of the speech signal off of surfaces within the room and the decay of the speech signal as it traveled through the air.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a HMD connected to a host computer system, a standalone HMD, a mobile device or computing system, or any other hardware platform capable of providing artificial reality content to one or more viewers.

Headset Configuration

FIG. 1 is an example illustrating a headset 100 including an audio assembly, according to one or more embodiments. The headset 100 presents media to a user. In one embodiment, the headset 100 may be a near-eye display (NED). In another embodiment, the headset 100 may be a head-mounted display (HMD). In general, the headset may be worn on the face of a user such that content (e.g., media content) is presented using one or both lens 110 of the headset. However, the headset 100 may also be used such that media content is presented to a user in a different manner. Examples of media content presented by the headset 100 include one or more images, video, audio, or some combination thereof. The headset 100 includes the audio assembly, and may include, among other components, a frame 105, a lens 110, and a sensor device 115. While FIG. 1 illustrates the components of the headset 100 in example locations on the headset 100, the components may be located elsewhere on the headset 100, on a peripheral device paired with the headset 100, or some combination thereof.

The headset 100 may correct or enhance the vision of a user, protect the eye of a user, or provide images to a user. The headset 100 may be eyeglasses which correct for defects in a user's eyesight. The headset 100 may be sunglasses which protect a user's eye from the sun. The headset 100 may be safety glasses which protect a user's eye from impact. The headset 100 may be a night vision device or infrared goggles to enhance a user's vision at night. The headset 100 may be a near-eye display that produces artificial reality content for the user. Alternatively, the headset 100 may not include a lens 110 and may be a frame 105 with an audio system that provides audio content (e.g., music, radio, podcasts) to a user.

The frame 105 includes a front part that holds the lens 110 and end pieces to attach to the user. The front part of the frame 105 bridges the top of a nose of the user. The end pieces (e.g., temples) are portions of the frame 105 that hold the headset 100 in place on a user (e.g., each end piece extends over a corresponding ear of the user). The length of the end piece may be adjustable to fit different users. The end piece may also include a portion that curls behind the ear of the user (e.g., temple tip, ear piece).

The lens 110 provides or transmits light to a user wearing the headset 100. The lens 110 may be prescription lens (e.g., single vision, bifocal and trifocal, or progressive) to help correct for defects in a user's eyesight. The prescription lens transmits ambient light to the user wearing the headset 100. The transmitted ambient light may be altered by the prescription lens to correct for defects in the user's eyesight. The lens 110 may be a polarized lens or a tinted lens to protect the user's eyes from the sun. The lens 110 may be one or more waveguides as part of a waveguide display in which image light is coupled through an end or edge of the waveguide to the eye of the user. The lens 110 may include an electronic display for providing image light and may also include an optics block for magnifying image light from the electronic display. Additional detail regarding the lens 110 is discussed with regards to FIG. 5. The lens 110 is held by a front part of the frame 105 of the headset 100.

In some embodiments, the headset 100 may include a depth camera assembly (DCA) (not shown) that captures data describing depth information for a local area surrounding the headset 100. In some embodiments, the DCA may include a light projector (e.g., structured light and/or flash illumination for time-of-flight), an imaging device, and a controller. The captured data may be images captured by the imaging device of light projected onto the local area by the light projector. In one embodiment, the DCA may include two or more cameras that are oriented to capture portions of the local area in stereo and a controller. The captured data may be images captured by the two or more cameras of the local area in stereo. The controller computes the depth information of the local area using the captured data and depth determination techniques (e.g., structured light, time-of-flight, stereo imaging, etc.). Based on the depth information, the controller determines absolute positional information of the headset 100 within the local area. The DCA may be integrated with the headset 100 or may be positioned within the local area external to the headset 100. In the latter embodiment, the controller of the DCA may transmit the depth information to the controller 125 of the headset 100. In addition, the sensor device 115 generates one or more measurements signals in response to motion of the headset 100. The sensor device 115 may be location on a portion of the frame 105 of the headset 100.

The sensor device 115 may include a position sensor, an inertial measurement unit (IMU), or both. Some embodiments of the headset 100 may or may not include the sensor device 115 or may include more than one sensor device 115.

In embodiments in which the sensor device 115 includes an IMU, the IMU generates IMU data based on measurement signals from the sensor device 115. Examples of sensor devices 115 include: one or more accelerometers, one or more gyroscopes, one or more magnetometers, another suitable type of sensor that detects motion, a type of sensor used for error correction of the IMU, or some combination thereof. The sensor device 115 may be located external to the IMU, internal to the IMU, or some combination thereof.

Based on the one or more measurement signals, the sensor device 115 estimates a current position of the headset 100 relative to an initial position of the headset 100. The estimated position may include a location of the headset 100 and/or an orientation of the headset 100 or the user's head wearing the headset 100, or some combination thereof. The orientation may correspond to a position of each ear relative to the reference point. In some embodiments, the sensor device 115 uses the depth information and/or the absolute positional information from a DCA to estimate the current position of the headset 100. The sensor device 115 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 100 from the sampled data. For example, the IMU integrates the measurement signals received from the accelerometers over time to estimate a velocity vector and integrates the velocity vector over time to determine an estimated position of a reference point on the headset 100. Alternatively, the IMU provides the sampled measurement signals to the controller 125, which determines the fast calibration data. The reference point is a point that may be used to describe the position of the headset 100. While the reference point may generally be defined as a point in space, however, in practice the reference point is defined as a point within the headset 100.

The audio assembly records a recording of a speech signal within a local area of audio assembly. The audio assembly comprises a microphone array and a local controller 125. However, in other embodiments, the audio assembly may include different and/or additional components. Similarly, in some cases, functionality described with reference to the components of the audio assembly can be distributed among the components in a different manner than is described here. For example, a controller stored on a remote server may receive recordings from both an origin audio assembly and a receiving audio assembly to extract acoustic properties or determine sound propagation effects of the environment. Such a controller may be capable of the same or additional functionality as the local controller 125. An embodiment of such a controller is described below with reference to FIG. 3.

The microphone arrays record speech signals within a local area of the headset 100 or the audio assembly embedded within the headset. A local area describes an environment surrounding the headset 100. For example, the local area may be a room that a user wearing the headset 100 is inside, or the user wearing the headset 100 may be outside and the local area is an outside area in which the microphone array is able to detect sounds. In an alternate embodiment, the local area may describe an area localized around the headset such that only speech signals in a proximity to the headset are recorded. The microphone array comprises at least one acoustic sensor coupled to the headset 100 to capture sounds emitted from the speaking user, for example their voice. In one embodiment, the microphone array comprises multiple sensors, for example microphones, to capture the recording. Increasing the number of acoustic sensors comprising the microphone array may improve the accuracy and signal to noise ratio of recordings recorded by the audio assembly, while also providing directional information describing the recorded signal.

In the illustrated configuration, the microphone array comprises a plurality of acoustic sensors coupled to the headset 100, for example acoustic sensor 120a, 120b, 120c, 120d, 120e, 120f, 120g and 120h. The acoustic sensors detect air pressure variations caused by a sound wave. Each acoustic sensor is configured to detect sound and convert the detected sound into an electronic format (analog or digital). The acoustic sensors may be acoustic wave sensors, microphones, sound transducers, or similar sensors that are suitable for detecting sounds. The acoustic sensors may be embedded into the headset 100, be placed on the exterior of the headset, be separate from the headset 100 (e.g., part of some other device), or some combination thereof. For example, in FIG. 1, the microphone array includes eight acoustic sensors: acoustic sensors 120a, 120b, which may be designed to be placed inside ear canals of a user wearing the headset 100, and acoustic sensors 120c, 120d, 120e, 120f, 120g, 120h, which are positioned at various locations on the frame 105. In one embodiment, recordings recorded by acoustic sensors 120a and 120b may be used to calculate interaural parameters of a signal's decay. The configuration of the acoustic sensors 120 of the microphone array may vary from the configuration described with reference to FIG. 1. The number and/or locations of acoustic sensor may be differ from what is shown in FIG. 1. For example, the number of acoustic sensors may be increased to increase the amount of audio information collected and the sensitivity and/or accuracy of the information. Alternatively, the number of acoustic sensors may be decreased to decrease computing power requirements to process recorded speech signals. The acoustic sensors may be oriented such that the microphone array is able to detect sounds in a wide range of directions surrounding the user wearing the headset 100. Each detected sound may be associated with a frequency, an amplitude, a duration, or some combination thereof.

The local controller 125 generates a recording of a speech signal based on the sounds recorded by the microphone array. The local controller 125 may also communicate speech signals from one headset to another, for example from an origin audio assembly to a receiving audio assembly and/or a controller on a server. In embodiments in which a remote controller stored independent of the audio assemblies (not shown in FIG. 1) extrapolate acoustic properties (e.g., estimated reverberation time, room-impulse response, room volume, etc.) of the room based on recordings of the speech signal, the local controller 125 communicates the recordings to the remote controller. In some embodiments, the local controller 125 performs beam forming techniques to remove background noise from the recording of the speech signal. A remote controller is further described with reference to FIG. 3. In alternate embodiments, the local controller 125 is capable of performing some, if not all, of the functionality of a remote controller.

In one embodiment, the local controller 125 generates one or more acoustic transfer functions for a user using the recordings recorded by individual acoustics sensors embedded within one or more headsets. Accordingly, the local controller 125 of a receiving audio assembly may receive a recording from an origin audio assembly or vice versa. An acoustic transfer function characterizes difference in sound between two points. The acoustic transfer function may be used to determine a room impulse response between the emitted sound and receiving audio assembly. The audio system may then use the room impulse response to generate audio content for the user. Additionally, the local controller 125 may process information from the microphone array that describes sounds detected by the microphone arrays into a representation of the sound propagation effects of the room in which the audio analysis system is positioned. The determination of sound propagation effects by a controller is further described with reference to FIG. 3.

FIG. 1 illustrates a configuration in which an audio assembly is embedded into a NED worn by a user. In alternate embodiments, the audio assembly may be embedded into a head-mounted display (HMD) worn by a user. Although the description above discusses the audio assemblies as embedded into headsets worn by a user, it would be obvious to a person skilled in the art, that the audio assemblies could be embedded into different headsets which could be worn by users elsewhere or operated by users without being worn.

Audio Analysis System

An audio analysis system comprises at least two audio assemblies associated with different users. Depending on which user emits a speech signal at any given time, the audio assembly designated as an origin audio assembly and the audio assembly designated as a receiving audio assembly may change. Additionally, in some embodiments, an audio assembly may be both an origin audio assembly and a receiving audio assembly over a same time period. The audio assembly of a speaking user (e.g., worn and/or used by) may be designated as the origin audio assembly. Additionally, the audio analysis system may be configured to include multiple receiving audio assemblies used by different users at various positions relative to the origin audio assembly.

Figure 2:
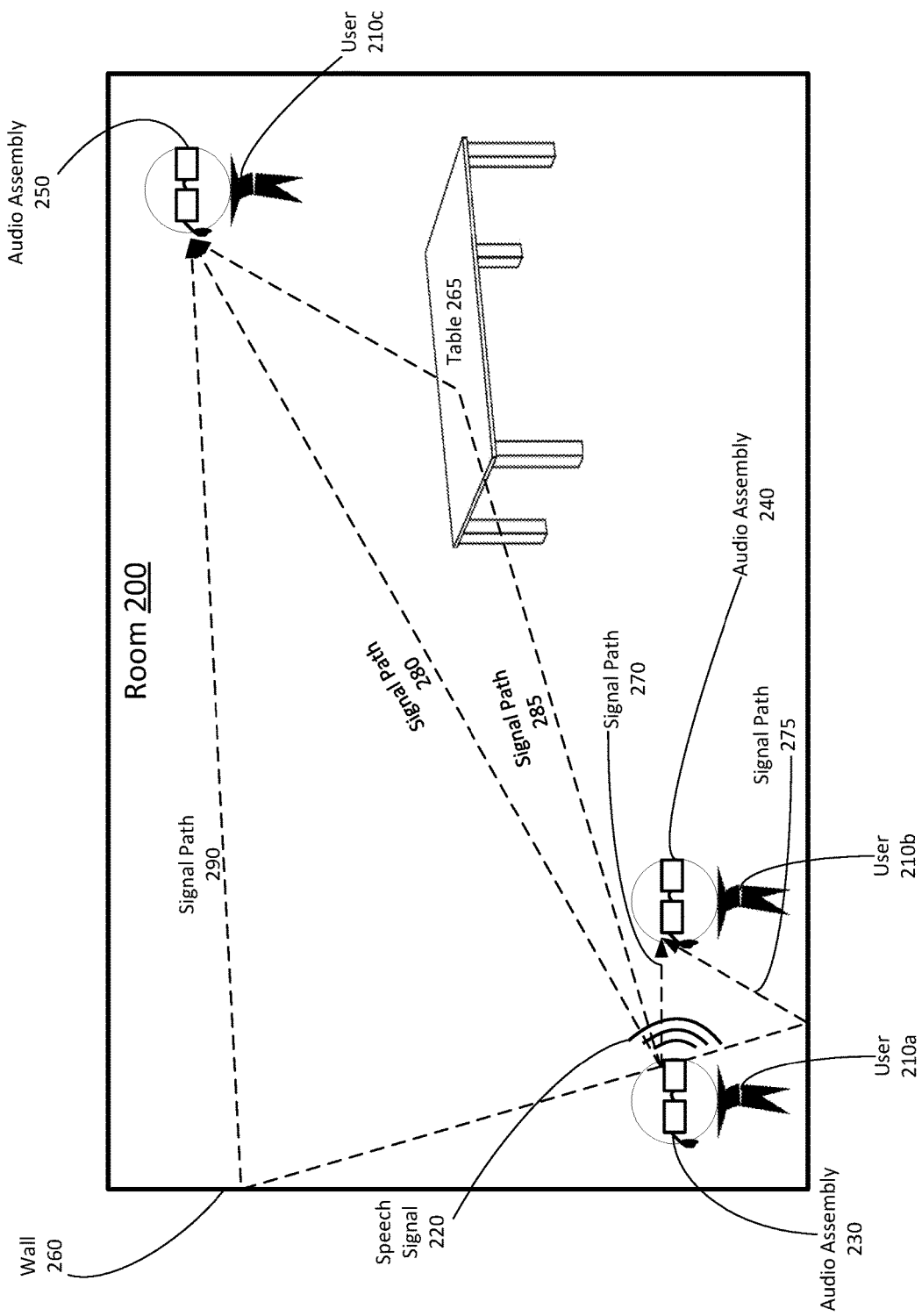
FIG. 2 illustrates the effects of surfaces in a room on the propagation of speech signals between an origin audio assembly and a receiving audio assembly, according to one or more embodiments.

FIG. 2 illustrates the effects of surfaces in a room on the propagation of speech signals between an origin audio assembly and a receiving audio assembly, according to one or more embodiments. An audio analysis system comprises at least two audio assemblies within a room. The illustrated embodiment comprises three audio assemblies (i.e., as part of headsets) used by three users. A user 210a uses an audio assembly 230, a user 210b uses an audio assembly 240, and a user 210c uses an audio assembly 250. Each user and their audio assembly is positioned with a room 200 bounded by a wall 260. In addition to the three users and their audio assemblies, the room 200 also contains a table 265. The audio assemblies 230, 240, 260 may be positioned in alternate locations within the room than those described with reference to FIG. 2. And the room may have a different geometry and/or objects than those described with reference to FIG. 2.

In the illustrated configuration, the user 210a generates a speech signal 220. A speech signal represents any sound emitted by a user which disperses throughout a room. The speech signal 220 propagates away from the user 210a through the room over various signal paths. The speech signal can reach a receiving audio assembly (e.g., audio assemblies 240, 250) via multiple paths (e.g., signal paths 270, 275, 280, 285, and 290). Depending on the positions of the users 210b and 210c and the corresponding audio assemblies 240 and 250, signal paths may travel various distances and reflect off of various surfaces before being recorded by a receiving audio assembly. Accordingly, signal paths traveling from an origin audio assembly to a receiving audio assembly may follow a direct path or an indirect path. Direct paths travel directly from a speaking user to a receiving audio assembly, for example the signal path 270 travels from the position of the audio assembly 230 directly to the position of the audio assembly 240 and signal path 280 travels from the position of the audio assembly 230 directly to the position of the audio assembly 250. In other embodiments, the path travels from the position of the origin audio assembly and reflects off of surfaces within the room before reaching the position of a receiving audio assembly. Such paths are referred to as indirect paths. The room includes some amount of reverberation. Reverberation is caused by sound (e.g., speech signal 220) in the room and a large number of reflections build up and decay as the sound is absorbed by the surfaces of objects/walls in the room. An estimated reverberation time is a measure of how long the room takes to absorb the sound.

Since the user 210a emits the speech signal 220, the audio assembly 230, which is closest in proximity to the user 210a, is the first audio assembly to record a recording of the speech signal 220. Accordingly, the audio assembly 230 is considered the origin audio assembly. Before each signal path travels beyond the local area of the audio assembly 230, the audio assembly 230 records the emitted speech signal 220.

In the illustrated configuration, the audio assembly 240 is positioned a shorter distance away from the audio assembly 230 (i.e., the origin audio assembly) than the audio assembly 250. In embodiments in which the system comprises multiple receiving users or receiving audio assemblies, for example FIG. 2, the speech signals recorded by each receiving audio assembly may be aggregated to improve the accuracy of the analysis performed on the signals. Such an embodiment addresses limitations within the frequency range of either the origin audio assembly, the receiving audio assemblies, or both.

In FIG. 2, the speech signal 220 propagates along signal path 270 traveling directly to the position of the audio assembly 240. Additionally, the speech signal propagates along the signal path 275. A speech signal 220 propagating along the signal path 275 encounters and reflects off the surface of the wall 260 before being redirected towards the position of the audio assembly 240. In addition, the signal paths 270 and 275, the audio assembly 240 may receive additional speech signals (not shown) at various directions of arrival. Therefore, the audio assembly 240 is considered a receiving audio assembly. Using the speech signals received over direct paths and indirect paths, the audio assembly 240 generates a recording of at least a portion of the speech which accounts for the effects of the room on sound propagation.

The speech signal 220 disperses throughout the room in directions beyond the signal paths 270 and 275. For example, the speech signal 220 also propagates over the signal paths 280, 285, and 290 to travel to the position of the audio assembly 250. The signal path 280, a direct path, travels directly from the position of the audio assembly 230 to the position of the audio assembly 250. The signal path 285 and the signal path 290 are indirect paths reflecting off of the table 265 and a surface of the wall 260, respectively, before reaching the audio assembly 250. In addition to the first speech signal 270 and the second speech signal 275, the first receiving audio assembly may receive several additional speech signals (not shown) at various directions of arrival. Therefore, the audio assembly 250 is also considered a receiving an audio assembly. The receiving audio assembly 240 also generates a complete recording of the sound using the direct speech signals 270 and indirect speech signals 275.

In the illustrated configuration, each audio assembly is positioned in a room, a controller (not shown) may be located one or all of the headsets, some other device within the room (e.g., a console), a remote server, or some combination thereof. Each audio assembly communicates recordings of speech signals to the controller.

A controller (not shown) receives the recording recorded by the origin audio assembly (e.g., audio assembly 230) which represents the speech signal before propagating throughout the room and recordings form the receiving audio assemblies (e.g., audio assemblies 240, 250). The controller selects portions of the recording from origin audio assembly and a receiving audio assembly. The controller uses the selected portions of the recordings to determine an acoustic transfer function for the room which can be used to determine an impulse response for the room (i.e., a room-impulse response).

Recordings of the speech signal 220 provides insight into how the layout and physical properties of the room affect sound propagation within the room. The room and objects in the room are composed of materials that have specific acoustic absorption properties that affect the room-impulse response. For example, a room composed of materials that absorb sound (e.g., a ceiling made of acoustic tiles and/or foam walls) will likely have a much different room impulse response than a room without those materials (e.g., a room with a plaster ceiling and concrete walls). Reverberations are much more likely to occur in the latter case as sound is not as readily absorbed by the room materials.

For each position of an audio assembly, the controller determines a room impulse response. A room impulse response is a representation of acoustic effects of an environment, for a given position of a source (e.g., a speaking user) and an audio assembly within a local area, a as sound propagates from the source to the audio assembly. Accordingly, for a given room there are a plurality of different room impulse responses that each correspond to different relative locations of the source and the audio assembly within the room. For example, the controller determines a room impulse based on the illustrated positions of the audio assembly 230 and 250. However, if the audio assembly 250 moves to a different position within the room, the controller determines a different room impulse response based on a different set of direct and indirect signals. In one embodiment, room impulse responses may be implemented to improve the accuracy of acoustic parameters that are generally constant throughout the room, for example reverberation time. Parameters generally constant throughout the room, may also hold constant as properties between different room impulse responses. In alternate embodiments, the controller uses multiple room impulse responses to generate a room impulse response model for the room. The room impulse response model comprises corresponding room impulse responses for some or all of the various position of a virtual speech source and an audio assembly within the room. The room impulse response model may be generated by extrapolating additional room impulse responses using the determined room impulse response modules. The additional room impulse responses correspond to different locations of the source and/or the audio assembly than those used to determine the plurality of room impulse responses.

The room-impulse response model may include a map of position-dependent parameters, for example early decay time and clarity. In some embodiments, information describing the direction of arrival of speech signals are determined based on response signals recorded by audio assemblies comprising multiple acoustic sensors.

A process for determining a room impulse response using the selected portions of the recordings is described with reference to FIGS. 3-4. Based on the room impulse response, the controller determines one or more acoustic properties of the room. Using the one or more acoustic parameters, in some embodiments, the audio analysis system may generate a virtual representation of the room 200 with an accurate simulation of the sound propagation effects based on the acoustic parameters of the room. Moreover, in embodiments, where the audio system has HRTFS for the user, the audio system may use the HRTFs and the one or more acoustic properties to place virtual audio sources within the room in a perceptually convincing manner (i.e., sound appears to originate from the virtual object).

Figure 3:
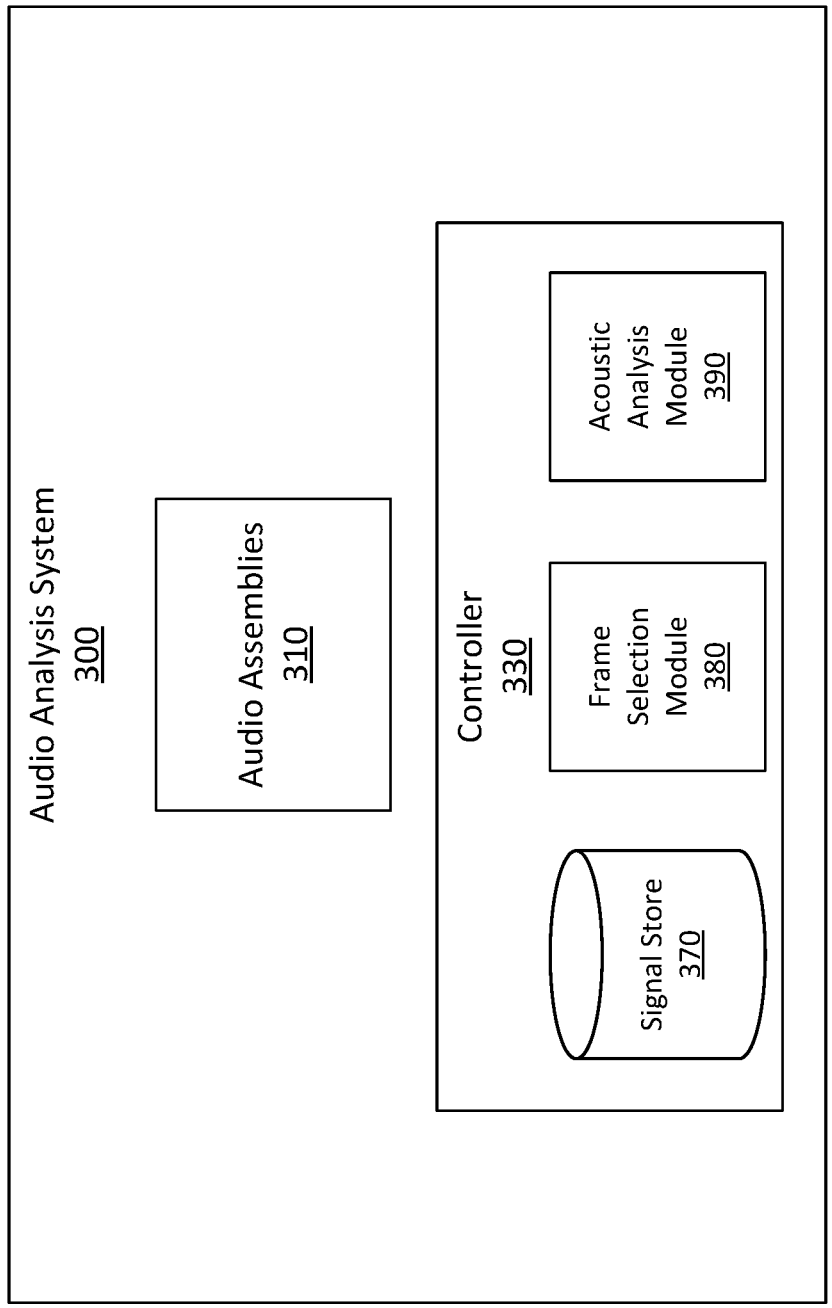
FIG. 3 is a block diagram of an audio analysis system, according to one or more embodiments.

FIG. 3 is a block diagram of an audio analysis system 300, according to one or more embodiments. The audio analysis system 300 determines acoustic properties of a room using collected audio content. The audio analysis system 300 includes audio assemblies 310 and a controller 330. However, in other embodiments, the audio analysis system 300 may include different and/or additional components. Similarly, in some cases, functions can be distributed among the components in a different manner than is described here.

The audio assemblies 310 record recordings of speech signals propagating through a room at various positions within the room. An audio assembly includes a microphone array and a local controller. The microphone array comprises several acoustics sensors which record recordings of a speech signal. The local controller processes the recordings from each acoustic sensor into a complete recording of the speech signals. The local controller may also communicate the complete recording to the controller 330 which determines a room impulse response for the room. The audio assemblies described with reference to FIGS. 1 and 2 are embodiments of the audio assemblies 310.

An audio assembly may operate as an origin audio assembly, a receiving audio assembly, or both. An audio assembly that records a sound (e.g., speech) made by its user is an origin audio assembly. An audio assembly which records sounds made by users of a different audio assembly is acting as a receiving audio assembly. In some instances, an audio assembly may be recording sounds made by its user and concurrently recording sounds made by a user of another audio assembly. In these instances, the audio assembly is acting both as an origin audio assembly as well as a receiving audio assembly.

The embedded microphone array of the origin audio assembly captures a recording of speech signal emitted from a speaking user of the origin audio assembly. Such a recording of the speech signal may be referred to as a "reference signal." As noted above with regard to FIG. 2, the speech signal propagates throughout a room via a plurality of paths.

A receiving audio assembly within the room captures a recording of the speech signal, the recording based on at least some of the plurality of paths (e.g., a direct path and one or more indirect paths). This second recording of the speech signal may be referred to as a "response signal."

The controller 330 determines acoustic properties of a room based on a recording from the audio assemblies 310. The controller 330 comprises a signal store 370, a frame selection module 380, and an acoustic analysis module 390. However, in other embodiments, the controller 300 may include different and/or additional components. Similarity, in some cases, functions can be distributed among the components in a different manner than is described here. For example, some or all of the functionality of the controller 300 may be performed by a local controller 125.

The signal store 370 stores information used by the audio analysis system 300. The signal store 370 may store, e.g., recording from the audio assemblies 310, audio content, HRTFs for the user, room-impulse responses, room acoustic properties, some other information used by the audio analysis system 300, or some combination thereof. A room impulse response describes effects of room (e.g., caused by geometry, material properties (e.g., acoustic absorption), objects in the room, etc.) on propagation of a speech signal within the room. Room acoustic properties describe how properties of a room affect sound propagation within the room. Room acoustic properties may include a geometry of the room, directional information describing the position of the origin audio assembly and the receiving audio assemblies, a spatial distribution of reverberations of the speech signal, direction of arrival and amplitude of the direct path and specular early reflections of the speech signal, a lateral energy fraction for the room, positions of objects within the room, or a combination thereof.

The frame selection module 380 receives the reference signal and the response signal and selects one or more audio frames in the first recording and one or more audio frames in the second recording that both occur over the same time period. As described herein, an audio frame represents a segment of a recording. For example, a reference signal may have been emitted over a period spanning from $t_1$ to $t_2$, but the response signal may be recorded over a time period spanning beyond $t_2$, for example from $t_1$ to $t_3$. Accordingly, the response signal may include a recording of sounds which are not associated with the reference signal recorded by the origin audio assembly 310. The frame selection module 380 compares the recording of both signals and selects a set of audio frames recorded over the same period of time to confirm that the content of the response signal is representative of the content of the reference signal with minimal interfering signals. The frame selection module 380 may perform a cross-correlation analysis on audio frames of the reference signal and the response signal and select audio frames with the highest cross-correlation. A cross-correlation function of two similar, delayed signals, yields a peak at the delay time by which the two signals may be aligned. The cross-correlation helps ensure that the selected frames contain the speech signal and less interfering signals (i.e., noise). In alternate embodiments, different techniques may be implemented to analyze and select audio frames of the reference and response signal.

In one embodiment, the frame selection module 380 selects a single common audio frame from the two recordings, whereas in other embodiments, the frame selection module 380 selects multiple common audio frames. To account for the unknown length of the room impulse response, the cross-correlation analysis may be performed on reference and response signals with various amounts of selected frame (i.e., varying signal lengths). In some embodiments, the frame selection module 380 aggregates frames from both the reference and response signals until sufficient frames have been selected to reach a desired decay level in a room impulse response. The decay level may be limited by the quality of the recording of the response signal, reference signal, or both. In some embodiment the frame selection module 380 implements a threshold number of frames based on the different between the direct signal and the strongest indirect signal recorded in the response signal. Accordingly, the threshold number of frames may depend on the distance between the origin audio assembly and the receiving audio assembly, surfaces within the room, and the material of those surfaces. In embodiments in which too few frames are selected from either the reference or response signal, the system generates an intermediate room impulse response (may also be referred to as a partial room impulse response). Intermediate room impulse responses may also be described as impulse responses which have not reached a full desired decay time. The frame selection module 380 may continue to select frames to determine a more complete, if not complete, room impulse response.

The frame selection module 380 may analyze the frames with the highest cross-correlations to remove any frames above a threshold noise level and keep any frames below the threshold noise level. The threshold noise level may be determined by the frame selection module 380 during a training period using a training data set of audio frames or may be manually determined by a human operator of the system. In some embodiments, the frame selection module 380 filters audio frames based on the threshold noise level before conducting the cross-correlation analysis, but in other embodiments filters the audio frames selected based on the cross-correlation analysis.

Additionally, the frame selection module 380 may identify audio frames recorded during a common time period during which both the origin audio assembly and receiving audio assembly have moved less than a threshold amount (e.g., substantially in the same locations over the time period). Changes in the positions (may include orientation) of the receiving audio assembly 320 and the origin audio assembly 310 relative to a previous position are measured using an inertial measurement unit sensor embedded into the headset. Using frames recorded while the origin audio assembly and receiving audio assembly move less than a threshold amount may increase an accuracy of the room-impulse response calculations.

The acoustic analysis module 390 determines a room-impulse response for a room using the selected frames from the frame selection module 380. The acoustic analysis module 390 receives and processes the selected frames from both the reference signal and the response signals to determine a multichannel room impulse response. At different positions within the room an audio assembly may receive a different combination of direct and indirect speech signals. Additionally, room impulse responses vary based on the times at which the recordings were recorded and the different frequencies of the speech signal being recorded. The acoustic analysis module 390 deconvolves the frames received from both the reference signal and the response signal to determine a room impulse response based on the frequency of the speech signal, the position of the audio assemblies, and the times of the recordings. Deconvolution is a technique used to solve for a solution to the equation:

$$h*S=R$$

where h represents the room impulse response, S represents the reference signal, and R represents the response signal. The deconvolution may be performed on a sequence of the shared frames and the results averaged across the sequence. In an alternative embodiment, the decay parameters determined for the sequence of frames are averaged.

In one embodiment, the acoustic analysis module 390 uses several room impulse responses to generate a room impulse response model for the entire room. Because each room impulse response is associated with a specific position of a receiving audio assembly and an origin audio assembly, a room impulse response model describes the acoustic effects of sound propagation at several, if not all, positions within the room. Based on the positions of each included room impulse response, the model may include a map describing position-dependent parameters for the room.

The acoustic analysis module 390 may extrapolate acoustic properties of the room using the room-impulse response. The acoustic analysis module 390 may perform frequency dependent regularization to eliminate any artifacts from the room impulse response caused by a limited signal-to-noise ratio or any signals within the frequency range. In embodiments in which the audio analysis system 300 comprises multiple receiving audio assembly 320 positioned throughout a room and each audio assembly 320 records a response signals for a single reference signal, the determined room impulse response may be used to determine a more comprehensive representation of the room. The components of the audio analysis system 300 are periodically implemented as either the origin audio assembly 310 or the receiving audio assembly 320 transition to a different position within the room such that, over time, the acoustic analysis module 390 is able generate a more accurate room impulse response. Using the room impulse response, the acoustic analysis module 390 is able to more accurately render sound in a room and, more specifically, determine the geometry of the room.

In some embodiments, the acoustic analysis module 390 performs additional post-processing or refinement steps to improve the room impulse response. In one embodiment, the acoustic analysis module 390 extends the decay of the signal, for example synthetically. The decay of a signal represents the amount of time that it takes for a speech signal to evaporate within a room. To extend the decay, the acoustic analysis module 390 extends the signal by decomposing the room impulse response into octave bands or ranges of frequencies associated with each indirect or direct speech signal.

Each octave bands is fitted to two linear functions: one for a linearly decaying energy decay curve (EDC) and one for the noise floor. The acoustic analysis module 390 aggregates the two functions and scales the aggregated function by the room impulse response, thereby adjusting the slope of the noise floor to match the decaying portion of the curve without adjusting the linearly decaying portion of the room impulse response. The resulting function represents an infinite decay room impulse response. Once the decay for each band has been increased by adjusting the noise floor, the acoustic analysis module 390 computes the sum of all octave bands to reconstruct the original room impulse response. By reconstructing the room impulse, the controller 330 is able to manipulate the decay of reverberations or reflections of the speech signal to improve the room impulse response.

The acoustic analysis module 390 may also determine monaural and binaural parameters for a room based on the room impulse responses. To determine monaural parameters, the microphone arrays in both the origin audio assembly and the audio assembly implement a monaural system of a single microphone to receive multiple signals at different channels and consolidate the signals into a single channel. Examples of monoaural parameters include, but are not limited to, the measurement of the amount of time required for a sound to decay 60 dB in a room (RT60), a measurement of clarity for the speech signal (i.e., c50 or c80), the early decay time, and the energy decay curve. To determine binaural parameters, the microphone arrays in both the origin audio assembly and the receiving audio assembly implement a binaural system including multiple microphones to create a 3-D stereo sound representative of a user actually in the room. Examples of binaural parameters include, but are not limited to, early InterAural Cross-correlation coefficient, late InterAural Cross-correlation coefficient, total InterAural Cross-correlation coefficient.

In one embodiment, using the multichannel impulse responses recorded by both the monaural and binaural systems, the acoustic analysis module 390 implements a parametric sound field analysis to extract spatial parameters for the room. Spatial parameters include, but are not limited to, direction information describing the position of the origin audio assembly and the receiving audio assembly, a spatial distribution of reverberations of the speech signal, a direction of arrival for direct speech signals, a strength of arrival of indirect speech signals from different directions within the room, and a lateral energy fraction for the room. The lateral energy fraction for the room is the ratio of the laterally reflected sound energy in a room over sound energy arriving from all directions including the direct sound energy from the source.

In one embodiment, the parametric sound field analysis identifies changes in reflections through space and relates the reflections to surfaces within the room. Using the parameters determined from the relationship between reflections through the room and the surfaces within the room, the positions of objects within the room may be interpolated or extrapolated. The parametric analysis may be implemented using a variety of techniques relying on the use of multiple signals recorded by the audio assembly to obtain information about the soundfield, and identify the amplitude, timing, spectrum, and direction of different sound events (for example, direct signals, specular, diffuse, and late indirect signals).

The acoustic analysis module 390 may also determine ambient conditions within the room affecting the speech signals emitted by the speaking user, for example the noise floor in the room, sources of noise within the room (for example, groups of people speaking at the same time as the speaking user or a running air conditioner), a potential distance between the speaking user and a receiving user, and a frequency range of human male or female speech.

In one embodiment, the acoustic analysis module 390 uses the determined room impulse response and the extracted spatial parameters to synthesize a virtual representation of the room. The virtual representation includes one or more of the following: a representation of a user of the origin audio assembly, the position of that user within the room, a representation of any users using the receiving audio assemblies, the position of those users, a representation of features (e.g., objects or furniture) within the room, the position of the features within the room, and physical properties of features within the room. Using the selected audio frames of the reference signal recorded by the receiving audio assembly, the acoustic analysis module 390 synthesizes binaural room impulse response of the speaking user-receiving user scenario from the perspective of the speaking user. Additionally, using the monaural room impulse response, the spatial information determined based on the sound field, and a head-related transfer function dataset, the acoustic analysis module 390 resynthesizes the position of the speaking user within the room. In one embodiment, the virtual representation is constructed using information describing the timing and direction of arrival of indirect speech signals to determine the location of surfaces within the room and the material of those surfaces.

Figure 4:
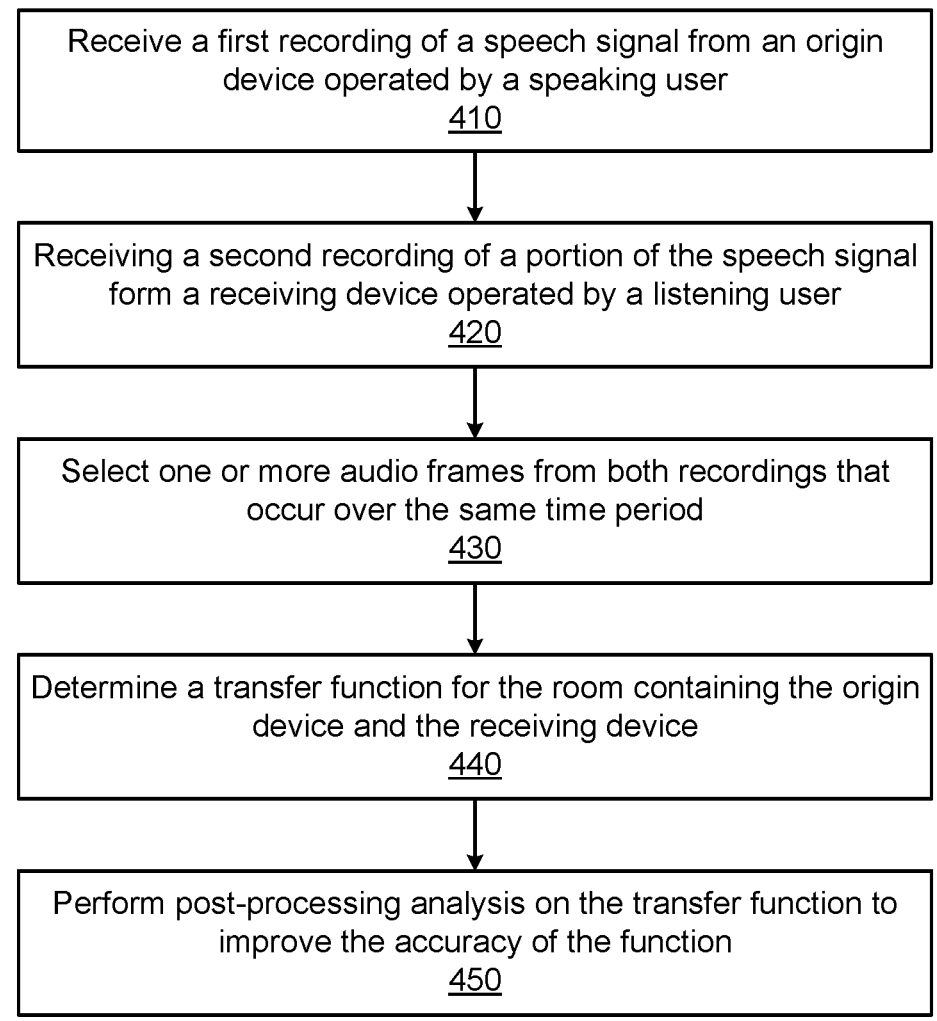
FIG. 4 is a flowchart illustrating the process of determining a room impulse response using the audio analysis system, according to one or more embodiments.

FIG. 4 is a flowchart illustrating the process of determining a room impulse response using the audio analysis system, according to one or more embodiments. In one embodiment, the process of FIG. 4 is performed an audio analysis system 300. Other entities may perform some or all of the steps of the process in other embodiments (e.g., a console). Likewise, embodiments may include different and/or additional steps or perform the steps in different orders.

The audio analysis system 300 receives 410 a first recording of a speech signal from an origin audio assembly that is used by a speaking user.

The audio analysis system 300 receives 420 a second recording of at least a portion of the speech signal from an audio assembly that is used by a listening user. After at least a portion of a speech signal has e been received and recorded by a receiving audio assembly (, the audio analysis system 300 receives 420 a second recording of a portion of the speech signal from the receiving audio assembly used by a listening user.

The audio analysis system 300 selects 430 one or more audio frames from both recordings that occur over the same time period. To select the one or more audio frames from both recordings, the audio analysis system 300 performs a similarity analysis on the two recordings. The audio analysis system 300 may also filter the audio frames by identifying frames which were recorded while both the receiving audio assembly and the origin audio assembly were in a substantially fixed position (e.g., movement is less than a threshold amount). The audio analysis system 300 may also select frames which include a noise level below a threshold.

The audio analysis system 300 determines 440 a transfer function for the room containing the audio assemblies 310. The audio analysis system 300 deconvolves the identified frames from the reference signal with the identified frames from the response signal to determine the room impulse response. In one embodiment, in order to perform the deconvolution in the frequency domain, the deconvolution process may include a frequency dependent regularization step. In embodiments in which a response signal is recorded by multiple users, a room impulse response is determined using each responses signal. The room impulse responses may be used to determine a room impulse response model for the room.

The audio analysis system 300 performs 450 post-processing analyses on the transfer function to improve the accuracy of the transfer function. For example, the audio analysis system may extend the decay time of the speech signal within the room or extract monaural and binaural impulse responses for the room. Using the extracted monaural and binaural impulse responses for the room, the controller synthesizes a virtual representation of the room, features within the room, and the position of the speakers within the room. The virtual representation of the room may be implemented in a VR environment in order to guide accurate sound propagation effects within the VR environment for the room.

Example System Environment

Figure 5:
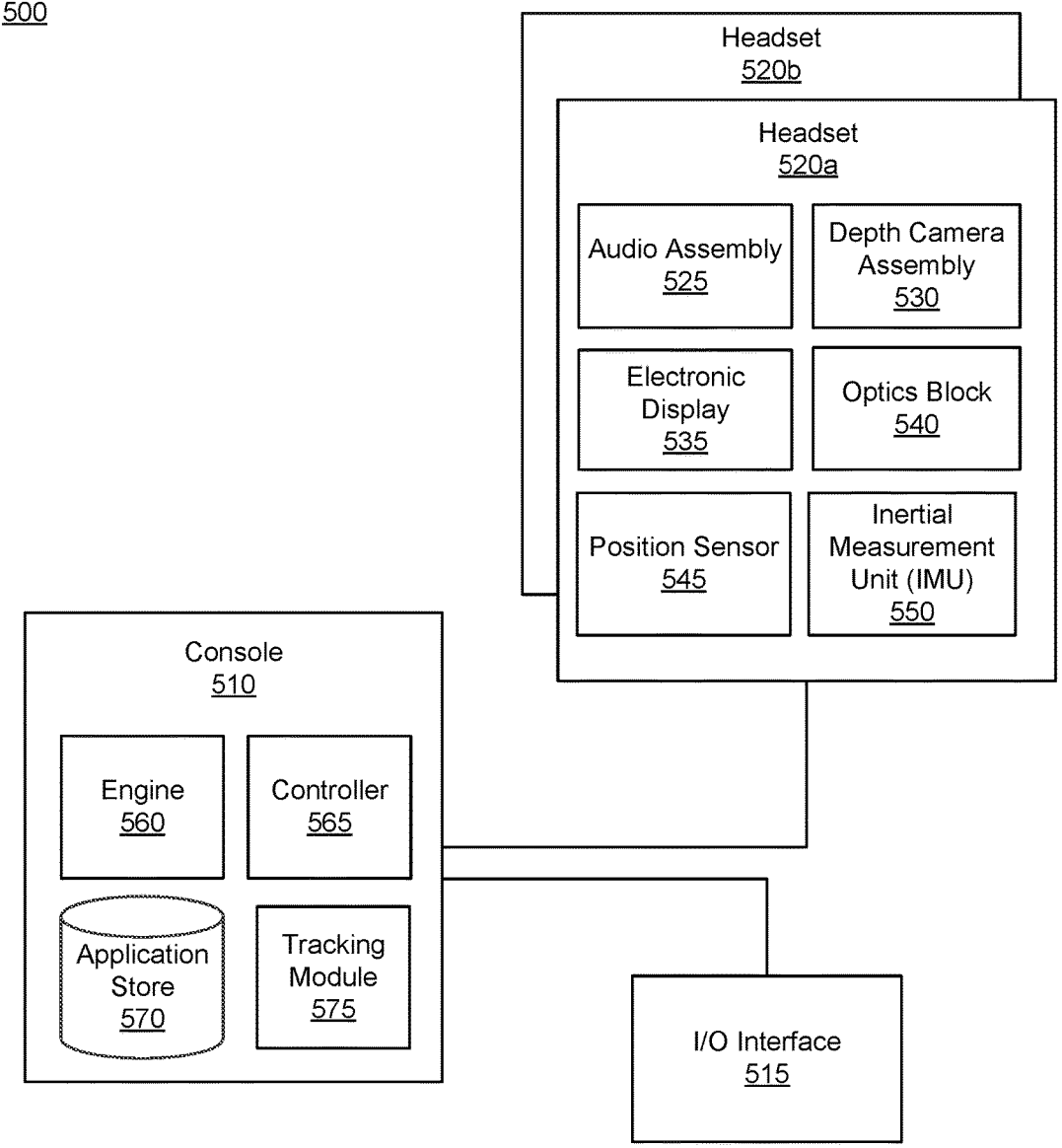
FIG. 5 is a block diagram of a system environment including an audio analysis system, according to one or more embodiments.

FIG. 5 is a block diagram of a system environment for a headset, according to one or more embodiments. The system 500 may operate in an artificial reality environment. The system 500 shown in FIG. 5 includes headsets 520a and 520b, an input/output (I/O) interface 515 that is coupled to a console 510. While FIG. 5 shows an example system of 500 including two headsets 520a and 520b and one I/O interface 515, in other embodiments any number of these components may be included in the system 500.

The headsets 520a and 520b may be an embodiment of the headset 100. In alternate embodiments, the headsets 520a and 520b may be multiple NED devices each having an associated I/O interface 515 with each headset 520 and I/O interface 515 communicating with the console 510. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 510 is provided by each of the plurality of headsets 520.

In some embodiments, the headsets 520 presents content to a user comprising augmented views of a physical, real-world environment with computer-generated elements (e.g., two dimensional (2D) or three dimensional (3D) images, 2D or 3D video, sound, etc.). In some embodiments, the presented content includes audio content that is generated via an audio analysis system that receives recordings of speech signals from the headsets 520, the console 510, or both, and presents audio content based on the recordings. In some embodiments, each headset 520 presents virtual content to the user that is based in part on a real environment surrounding the user. For example, virtual content may be presented to a user of the headset. The user physically may be in a room, and virtual walls and a virtual floor of the room are rendered as part of the virtual content. In the embodiment of FIG. 5, the headset 520a includes an audio assembly 525, an electronic display 535, an optics block 540, a position sensor 545, a depth camera assembly (DCA) 530, and an inertial measurement (IMU) unit 550. Some embodiments of headsets 520 have different components than those described in conjunction with FIG. 5. Additionally, the functionality provided by various components described in conjunction with FIG. 5 may be distributed differently among the components of the headsets 520 in other embodiments or be captured in separate assemblies remote from the plurality of headsets 520. Functionality described with reference to the components of the headset 520a also applies to the headset 520b.

In some embodiments, the audio assembly 525 generates a recording of a sound emitted from a user within a room and communicates the recording to a remote controller, for example controller 330, or a local controller, for example controller 125 to extract data describing a set of acoustic properties describing the surrounding environment. The audio assembly is an embodiment of the audio assemblies 310 described with reference to FIG. 3. The speech signals recorded by the audio assembly 525 are used by an audio analysis system determine acoustic properties for a room. The audio assembly 525 may include a microphone array and a local controller, among other components. The microphone array detects sounds within a local area surrounding the microphone array. The microphone array may include a plurality of acoustic sensors that each detect air pressure variations of a sound wave and convert the detected sounds into an electronic format (analog or digital). The plurality of acoustic sensors may be positioned on a headset (e.g., headset 100), on a user (e.g., in an ear canal of the user), on a neckband, or some combination thereof.

The local controller may generate a complete recording of a speech signal based on recordings from individual acoustic sensors of the microphone arrays. The local controller may also communicate recordings recorded by the audio assemblies to a remote controller for the recordings to be analyzed.

The electronic display 535 displays 2D or 3D images to the user in accordance with data received from the console 510. In various embodiments, the electronic display 535 comprises a single electronic display or multiple electronic displays (e.g., a display for each eye of a user). Examples of the electronic display 535 include: a liquid crystal display (LCD), an organic light emitting diode (OLED) display, an active-matrix organic light-emitting diode display (AMO-LED), some other display, or some combination thereof.

The optics block 540 magnifies image light received from the electronic display 535, corrects optical errors associated with the image light, and presents the corrected image light to a user of the headset 520. The electronic display 535 and the optics block 540 may be an embodiment of the lens 110. In various embodiments, the optics block 540 includes one or more optical elements. Example optical elements included in the optics block 540 include: an aperture, a Fresnel lens, a convex lens, a concave lens, a filter, a reflecting surface, or any other suitable optical element that affects image light. Moreover, the optics block 540 may include combinations of different optical elements. In some embodiments, one or more of the optical elements in the optics block 540 may have one or more coatings, such as partially reflective or anti-reflective coatings.

Magnification and focusing of the image light by the optics block 540 allows the electronic display 535 to be physically smaller, weigh less, and consume less power than larger displays. Additionally, magnification may increase the field of view of the content presented by the electronic display 535. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block 540 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display 535 for display is pre-distorted, and the optics block 540 corrects the distortion when it receives image light from the electronic display 535 generated based on the content.

The DCA 530 captures data describing depth information for a local area surrounding the headset 520. In one embodiment, the DCA 530 may include a structured light projector, an imaging device, and a controller. The captured data may be images captured by the imaging device of structured light projected onto the local area by the structured light projector. In one embodiment, the DCA 530 may include two or more cameras that are oriented to capture portions of the local area in stereo and a controller. The captured data may be images captured by the two or more cameras of the local area in stereo. The controller computes the depth information of the local area using the captured data. Based on the depth information, the controller determines absolute positional information of the headset 520 within the local area. The DCA 530 may be integrated with the headset 520 or may be positioned within the local area external to the headset 520. In the latter embodiment, the controller of the DCA 530 may transmit the depth information to a controller of the audio analysis system 300.

The IMU 550 is an electronic device that generates data indicating a position of the headset 520 based on measurement signals received from one or more position sensors 540. The one or more position sensors 540 may be an embodiment of the sensor device 115. A position sensor 545 generates one or more measurement signals in response to motion of the headset 520. Examples of position sensors 540 include: one or more accelerometers, one or more gyroscopes, one or more magnetometers, another suitable type of sensor that detects motion, a type of sensor used for error correction of the IMU 550, or some combination thereof. The position sensors 540 may be located external to the IMU 550, internal to the IMU 550, or some combination thereof.

Based on the one or more measurement signals from one or more position sensors 540, the IMU 550 generates data indicating an estimated current position of the headset 520 relative to an initial position of the headset 520. For example, the position sensors 540 include multiple accelerometers to measure translational motion (forward/back, up/down, left/right) and multiple gyroscopes to measure rotational motion (e.g., pitch, yaw, and roll). In some embodiments, the IMU 550 rapidly samples the measurement signals and calculates the estimated current position of the headset 520 from the sampled data. For example, the IMU 550 integrates the measurement signals received from the accelerometers over time to estimate a velocity vector and integrates the velocity vector over time to determine an estimated current position of a reference point on the headset 520. Alternatively, the IMU 550 provides the sampled measurement signals to the console 510, which interprets the data to reduce error. The reference point is a point that may be used to describe the position of the headset 520. The reference point may generally be defined as a point in space or a position related to the headset 520 orientation and position. In some embodiments, the IMU 550 and the position sensor 545 may function as a sensor device (not shown).

The I/O interface 515 is a device that allows a user to send action requests and receive responses from the console 510. An action request is a request to perform a particular action. For example, an action request may be an instruction to start or end capture of image or video data, start or end the audio analysis system 300 from recording sounds, start or end a calibration process of the headset 520, or an instruction to perform a particular action within an application. The I/O interface 515 may include one or more input devices. Example input devices include: a keyboard, a mouse, a game controller, or any other suitable device for receiving action requests and communicating the action requests to the console 510. An action request received by the I/O interface 515 is communicated to the console 510, which performs an action corresponding to the action request. In some embodiments, the I/O interface 510 includes an IMU 540, as further described above, that captures calibration data indicating an estimated position of the I/O interface 515 relative to an initial position of the I/O interface 515. In some embodiments, the I/O interface 515 may provide haptic feedback to the user in accordance with instructions received from the console 510. For example, haptic feedback is provided when an action request is received, or the console 510 communicates instructions to the I/O interface 515 causing the I/O interface 515 to generate haptic feedback when the console 510 performs an action.

The console 510 provides content to the headset 520 for processing in accordance with information received from one or more of: the plurality of headsets 520 and the I/O interface 515. In the example shown in FIG. 5, the console 510 includes an application store 570, a tracking module 575, and an engine 560. Some embodiments of the console 510 have different modules or components than those described in conjunction with FIG. 5. Similarly, the functions further described below may be distributed among components of the console 510 in a different manner than described in conjunction with FIG. 5.

The controller 565 determines a room impulse response for the room in which the headset 505 is positioned. The controller 565 may be a component of the audio analysis system which receives recordings recorded by the audio assembly 525. Using the recordings, the controller 565 determines a room impulse response for the room. The controller 565 may be an embodiment of the controller 330. The controller 565 receives a recording of the speech signal from a headset 520 including an origin audio assembly and a recording of at least a portion of the speech signal from a headset 520 including a receiving audio assembly. From the recordings, the controller 565 performs a deconvolution to determine a transfer function which is used to determine a room impulse response describing the acoustic properties of the room. Audio content is presented to users by the based on the determined room impulse response.

The application store 570 stores one or more applications for execution by the console 540. An application is a group of instructions, that when executed by a processor, generates content for presentation to the user. Content generated by an application may be in response to inputs received from the user via movement of the headset 520 or the I/O interface 515. Examples of applications include: gaming applications, conferencing applications, video playback applications, calibration processes, or other suitable applications.

The tracking module 575 calibrates the system environment 500 using one or more calibration parameters and may adjust one or more calibration parameters to reduce error in determination of the position of the headset 520 or of the I/O interface 515. Calibration performed by the tracking module 575 also accounts for information received from the IMU 540 in the headset 520 and/or an IMU 540 included in the I/O interface 515. Additionally, if tracking of the headset 520 is lost, the tracking module 575 may re-calibrate some or all of the system environment 500.

The tracking module 575 tracks movements of the plurality of headsets 520 or of the I/O interface 515 using information from the one or more sensor devices 535, the IMU 540, or some combination thereof. For example, the tracking module 575 determines a position of a reference point of the headset 520 in a mapping of a local area based on information from the headset 520. The tracking module 575 may also determine positions of the reference point of the headset 520 or a reference point of the I/O interface 515 using data indicating a position of the headset 520 from the IMU 540 or using data indicating a position of the I/O interface 515 from an IMU 550 included in the I/O interface 515, respectively. Additionally, in some embodiments, the tracking module 575 may use portions of data indicating a position or the headset 520 from the IMU 540 to predict a future location of the headset 520. The tracking module 575 provides the estimated or predicted future position of the headset 520 or the I/O interface 515 to the engine 560.

The engine 560 also executes applications within the system environment 500 and receives position information, acceleration information, velocity information, predicted future positions, audio information, or some combination thereof of the plurality of headsets 520 from the tracking module 575. Based on the received information, the engine 560 determines content to provide to the plurality of headsets 520 for presentation to the user. For example, if the received information indicates that the user has looked to the left, the engine 560 generates content for the plurality of headsets 520 that mirrors the user's movement in a virtual environment or in an environment augmenting the local area with additional content. Additionally, the engine 560 performs an action within an application executing on the console 510 in response to an action request received from the I/O interface 515 and provides feedback to the user that the action was performed. The provided feedback may be visual or audible feedback via the plurality of headsets 520 or haptic feedback via the I/O interface 515.

Using the room impulse response and a head-related transfer function for a user of the headset 520, the engine 560 renders perceptually convincing, spatialized audio content for virtual objects in VR environments consistent with the room impulse response and acoustic properties of the room.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
receiving a first recording of a speech signal from an origin audio assembly and a second recording that includes at least a portion of the speech signal, wherein the speech signal originates from a speaking user of the origin audio assembly and the second recording is recorded at a receiving audio assembly operated by a different user and both the origin audio assembly and the receiving audio assembly are located within a room;
selecting one or more audio frames in the first recording and one or more audio frames in the second recording that both occur over a same time period; and
determining a transfer function for the room based in part on the selected one or more audio frames in the first recording and the selected one or more audio frames in the second recording.

2. The method of claim 1, wherein the origin audio assembly includes a first microphone array and the receiving audio assembly includes a second microphone array, wherein the first microphone array generates the first recording and the second microphone array generates the second recording.

3. The method of claim 1, wherein the selected one or more audio frames in the first recording and the selected one or more audio frames in the second recording have a noise level below a threshold value.

4. The method of claim 1, wherein selecting the one or more audio frames in the first recording and the one or more audio frames in the second recording that both occur over a same time period comprises:
identifying audio frames from the first recording and the second recording that occur over a same time period while a change in relative position between the origin audio assembly and the receiving audio assembly is below a threshold value; and
selecting the identified audio frames in the first recording and the second recording.

5. The method of claim 1, wherein the transfer function for the room describes at least an effect of the room on the speech signal recorded by the origin audio assembly.

6. The method of claim 1, further comprising:
estimating one or more room parameters from the transfer function of the room, the room parameters including one or more of the following:
directional information describing a position of the origin audio assembly and the receiving audio assembly;
a spatial distribution of reverberations of the speech signal;
a direction of arrival for a direct reverberation of the speech signal;
a strength of arrival of reverberations of the speech signal from different directions within the room; and
a lateral energy fraction for the room.

7. The method of claim 1, further comprising:
synthesizing a virtual representation of the speaking user within the room based in part on the transfer function.

8. A device comprising:
a microphone array comprising a plurality of acoustic sensors, wherein the microphone array records a first recording of a speech signal originating from a speaking user; and
a controller configured to:
receive a second recording of the speech signal recorded at a receiving audio assembly that is remote from the device, wherein the device and the receiving audio assembly are located within a room;
select one or more audio frames in the first recording and one or more audio frames in the second recording that both occur over a same time period; and
determine a transfer function for the room based in part on the selected one or more audio frames in the first recording and the selected one or more audio frames in the second recording.

9. The device of claim 8, wherein the receiving audio assembly includes a second microphone array which generates the second recording.

10. The device of claim 8, wherein the selected one or more audio frames in the first recording and the selected one or more audio frames in the second recording have a noise level below a threshold value.

11. The device of claim 8, wherein the controller is further configured to:
identify audio frames from the first recording and the second recording recorded that occur over a same time period while a change in relative position between the device and the receiving audio assembly is below a threshold value; and
select the identified audio frames in the first recording and the second recording.

12. The device of claim 8, wherein the transfer function for the room describes at least an effect of the room on the speech signal recorded by the microphone array.

13. The device of claim 8, wherein the controller is further configured to:
estimate one or more room parameters from the transfer function of the room, the room parameters comprising:
directional information describing a position of the device and the receiving audio assembly;
a spatial distribution of reverberations of the speech signal;
a direction of arrival for a direct reverberation of the speech signal;
a strength of arrival of reverberations of the speech signal from different directions within the room; and
a lateral energy fraction for the room.

14. The device of claim 8, wherein the controller is further configured to:
synthesize a virtual representation of the speaking user within the room based in part on the transfer function.

15. A non-transitory computer-readable medium configured to store computer-readable instructions that, when executed by a processor, cause the processor to:
receive a first recording of a speech signal from an origin audio assembly and a second recording that includes at least a portion of the speech signal, wherein the speech signal originates from a speaking user of the origin audio assembly and the second recording is recorded at a receiving audio assembly operated by a different user and both the origin audio assembly and the receiving audio assembly are located within a room;
select one or more audio frames in the first recording and one or more audio frames in the second recording that both occur over a same time period; and
determine a transfer function for the room based in part on the selected one or more audio frames in the first recording and the selected one or more audio frames in the second recording.

16. The non-transitory computer-readable medium of claim 15, wherein the origin audio assembly includes a first microphone array and the receiving audio assembly includes a second microphone array, wherein the first microphone array generates the first recording and the second microphone array generates the second recording.

17. The non-transitory computer-readable medium of claim 15, wherein the selected one or more audio frames in the first recording and the selected one or more audio frames in the second recording have a noise level below a threshold value and selecting the one or more audio frames in the first recording and the one or more audio frames in the second recording that both occur over a same time period comprises instructions to:
    identify audio frames from the first recording and the second recording recorded that occur over a same time period while a change in relative position between the origin audio assembly and the receiving audio assembly is below a threshold value; and
    select the identified audio frames in the first recording and the second recording.

18. The non-transitory computer-readable medium of claim 15, wherein the transfer function for the room describes at least an effect of the room on the speech signal recorded by the origin audio assembly.

19. The non-transitory computer-readable medium of claim 15, further comprising instructions to:
    estimate one or more room parameters from the transfer function of the room, the room parameters comprising:
        directional information describing a position of the receiving audio assembly and the origin audio assembly;
        a spatial distribution of reverberations of the speech signal;
        a direction of arrival for a direct reverberation of the speech signal;
        a strength of arrival of reverberations of the speech signal from different directions within the room; and
        a lateral energy fraction for the room.

20. The non-transitory computer-readable medium of claim 15, further comprising instructions to:
    synthesize a virtual representation of the speaking user within the room based in part on the transfer function.

* * * * *